United States Patent
Govil et al.

(10) Patent No.: US 11,122,462 B2
(45) Date of Patent: Sep. 14, 2021

(54) METHOD AND SYSTEM FOR HANDLING CHECKSUM ERROR IN UPLINK DATA COMPRESSION

(71) Applicant: SAMSUNG ELECTRONICS CO., LTD., Suwon-si (KR)

(72) Inventors: Shalini Govil, Bangalore (IN); Pavan Kumar Devarayanigari, Bangalore (IN); Rohit Kumar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 16/675,668

(22) Filed: Nov. 6, 2019

(65) Prior Publication Data

US 2020/0169914 A1 May 28, 2020

(30) Foreign Application Priority Data

Nov. 6, 2018 (IN) .............................. 201841041986
Nov. 5, 2019 (IN) .............................. 2018-41041986

(51) Int. Cl.
*H04W 28/02* (2009.01)
*H04L 12/24* (2006.01)
*H04B 17/309* (2015.01)

(52) U.S. Cl.
CPC ...... *H04W 28/0294* (2013.01); *H04B 17/309* (2015.01); *H04L 41/0672* (2013.01)

(58) Field of Classification Search
CPC ... H04L 1/0003; H04L 1/0009; H04L 1/1809; H04L 2001/0092
See application file for complete search history.

(56) References Cited

U.S. PATENT DOCUMENTS

| | | | |
|---|---|---|---|
| 8,060,096 B2 * | 11/2011 | Son | H04L 1/1809 455/437 |
| 9,674,803 B2 * | 6/2017 | Eravelli | H04W 56/001 |
| 10,674,396 B2 * | 6/2020 | Yang | H04W 28/04 |
| 2015/0124839 A1 * | 5/2015 | Kim | H04L 12/6418 370/467 |

* cited by examiner

*Primary Examiner* — Chandrahas B Patel
(74) *Attorney, Agent, or Firm* — F. Chau & Associates, LLC

(57) ABSTRACT

A method for handling checksum error in uplink data compression (UDC) in a wireless communication system includes: detecting, by user equipment (UE), a checksum failure; automatically controlling, by the UE, generation of a number of compressed protocol data units (PDUs) available for transmission at a Packet Data Convergence Protocol (PDCP) based on a package formation rate (PFT); and transmitting, by the UE, a number of compressed PDUs.

19 Claims, 12 Drawing Sheets

METHOD AND SYSTEM FOR HANDLING CHECKSUM ERROR IN UPLINK DATA COMPRESSION

CROSS-REFERENCE TO RELATED APPLICATION

This U.S. patent applications claims the benefit of priority under 35 U.S.C. § 119 to Indian Provisional Patent Application No. 201841041986 filed on Nov. 6, 2018, and Indian Patent Application No. 201841041986 filed on Nov. 5, 2019, the disclosures of which are incorporated by reference in their entireties herein.

TECHNICAL FIELD

The present disclosure relates to a wireless communication, and more specifically relates to a method and system for handling checksum error in uplink data compression.

DISCUSSION OF RELATED ART

In general, 3$^{rd}$ Generation Partnership Project (3GPP) Long Term Evolution (LTE) Release 15 (Rel-15) introduced Uplink Data Compression (UDC) feature with the motive to enhance uplink (UL) transmission (TX) for power starved/limited devices and at the same time help network/base station scheduler, or evolved NodeB (eNB), to enhance the UL bandwidth usage/capacity. The UDC is primarily effective for traffic types which have repetitive blocks. There are many traffic types which have shown great compression result. The UDC uses a Deflate procedure. In order to ensure higher compression efficiency, the Deflate procedure updates the compression buffer every single data block compression. Therefore, the success of UDC depends on strict in-sequence delivery and compression buffer synchronization between transmitter and receiver node; failing which receiver may decode the content incorrectly. To ensure this, the 3GPP configures UDC in Radio Link Control (RLC) Acknowledged mode (AM) only and deploys it at Packet Data Convergence Protocol (PDCP) level. FIG. 1 depicts the working of the UDC method on a user Equipment (UE). SDU P1 is compressed to P1'. In order to check buffer synchronization at receiver, checksum C1 is computed using compression buffer with which data block was compressed. Thus U1 is compressed data containing C1+P1' and subsequently compression buffer is updated with P1 content by left shifting the buffer with P1 size. As the compression buffer update is per SDU basis, this seems as a double edged sword for compression efficiency as writing the compression buffer with stale data may reduce subsequent efficiency. In order to address this, 3GPP provided the UE with a choice and left the decision on UE's wisdom to transmit the data uncompressed and thus not alter the compression buffer content.

In the existing methods, including UDC over new radio (NR)/new features is not being treated by 3GPP for now. The 'strict in sequence delivery' requirement has also lead to some apprehensions on further extending existing UDC as data compression scheme.

Limitations of UDC Method

Packet Loss Issue:

In existing methods, on encountering checksum failure, receiving entity drops all subsequent compressed data PDUs (compressed with ongoing compression buffer), until it receives freshly compressed PDUs (indicated by PDCP header). The magnitude of dropped PDUs is proportional to delay (RTT) incurred in UDC packet transmission, processing at the receiver and/or transmitter and amount of uplink resource allocation. In other words, RTT time is a period starting from the (corrupted) compressed data block transmission time at the UE to the time it learns about checksum failure. FIG. 2 depicts the current UE and eNB behaviour in case of checksum failure. The UE has 40 compressed PDUs (U1-U40; compressed size of 200 Byte each) ready for transmission. The PDUs U1-U20 are transmitted on receiving grant from the base station. The receiving MAC entity (eNB-MAC), forwards the received PDUs to higher layers for processing and also sends grant to the UE for further UL data transmission, over which compressed PDUs U21-U40 are transmitted. Meanwhile, eNB PDCP encounters checksum error in U20, generates PDCP status report indicating the failure and discards all the PDUs (U21-U40) till it receives freshly compressed PDU.

Limited UDC Application:

3GPP LTE Rel-15 introduced plethora of other features like (1) Split bearer, in which PDCP UL data can be transmitted via Radio Link Control (RLC) entities mapped to master cell group (MCG) and secondary cell group (SCG); (2) PDCP duplication, in which same PDCP data can be sent through multiple RLC entities and; (3) RLC-out-of-order delivery for acknowledged and un-acknowledged mode both, where receiving RLC entity need not wait for the data to arrive in sequence before submitting to higher layer. These features target higher throughput, at the same time achieving balanced data processing load where earlier system failed to achieve balanced processing load due to in-sequence delivery. Applying existing UDC over new features either results in (a) imbalance in packet processing by ensuring in sequence data processing or (b) leads to frequent checksum failure due to out of sequence data processing. Though, approach (a) is preferable. Either way, the system performance will be degraded. Exclusion of UDC from new feature limits the compression scope to very small traffic scenarios. Overall, these features seem to have done injustice for traffic mapped on UDC or vice-versa as they cannot be configured simultaneously and therefore head to limited application or curb network scheduling flexibility.

In Rel-15, 3GPP introduced deflate based uplink data compression (UDC) for improving uplink (UL) throughput. According to specification 36.323, UDC works on the condition that compression buffer and decompression buffer are synchronized which is ensured through checksum, indicated as part of packet data convergence protocol (PDCP) header of every compressed uplink data compression (UDC) protocol data unit (PDU). Checksum is calculated by content of current compression buffer before the current packet is put into buffer.

The checksum calculation is performed based on a UDC buffer reset procedure. In the UDC buffer reset procedure, the UDC works on the condition that compression buffer and de-compression buffer are synchronized. UDC buffer reset mechanism is to resynchronize buffer when error is detected. For resynchronization, UE shall reset the compression buffer to all zeros. After performing the reset, the FR field in UDC header of the first compressed PDU shall be set to 1.

UDC Checksum Error Handling:

UDC checksum error notification PDCP control PDU indicates the compression buffer and de-compression buffer are out of synchronization. When receiving the notification, the UE shall trigger UDC buffer reset procedure to resynchronize the compression buffer.

Checksum Calculation:

Length: 4 bits

This field contains the validation bits for the compression buffer content: The checksum is calculated by the content of current compression buffer before the current packet is put into buffer.

The checksum is derived from the values of the first 4 bytes and the last 4 bytes in the whole compression buffer. The calculation is described as follows:

I. Each byte is divided into two 4-bit numbers.

II. The 16 4-bit numbers are added together to obtain a sum;

III. The checksum is one's complement of the rightmost 4 bits (i.e. 4 LSB) of the sum.

FIG. 3 is a flow diagram illustrating a checksum error detection, according to a prior art.

In the event of Discard Timer expiry, one or more of the UDC PDU could be discarded locally and therefore the subsequent PDUs if transmitted could cause Checksum Failure indication at the receiver (NW) side since the dictionary or the UDC compression buffer may not be in the sync as the compressed UDC PDUs were discarded locally. Since, UE is aware in advance of the above problem, it could recover from this scenario by several methods where two are mentioned as below:

By maintaining multiple UDC compression buffer copy for each PDCP SDU which it compressed. By triggering UDC reset procedure at UE and indicating the NW about the same that UDC buffer is reset by setting FR bit as 1. (where FR bit is part of UDC header and as defined in 3gpp spec 36323 Rel 15)

In a problem (example) scenario as described in the FIG. 3, where an UDC configured RB has 4 compressed PDCP/UDC PDU to be sent to the NW. In the figure, we could see that Uplink Grant is received at UE and UDC discard timer for some of UDC compressed PDU has expired around same time; in those cases, if UE cannot freshly compressed the subsequent compressed UDC PDUs as mentioned by the above methods while sending the subsequent UDC PDUs over this grant allocation could cause check sum failure. So this is the problem point which is being shown in the MSC where U2 got discarded and U3 got transmitted without freshly compression.

Thus, it is desired to address the above mentioned disadvantages or other shortcomings or at least provide a useful alternative.

SUMMARY

At least one embodiment of the inventive concept provides a method and system for handling checksum error in uplink data compression.

At least one embodiment of the inventive concept handles checksum errors in compressed packers on a same radio bearer.

At least one embodiment of the inventive concept handles transmission of compressed and uncompressed packets on a same radio bearer.

An exemplary embodiment of the inventive concept provides a method for handling checksum error in an UDC in a wireless communication system. The method includes detecting, by a UE, a checksum failure. Further, the method includes automatically controlling, by the UE, generation of a number of compressed PDUs available for transmission at a Packet Data Convergence Protocol (PDCP) based on a packet formation rate (PFT). Further, the method includes transmitting, by the UE, a number of compressed PDUs.

In an embodiment, the PFT is configured for at least one UDC enabled bearer to control the number of compressed PDUs available for transmission.

In an embodiment, the PFT is determined by determining a channel conditions based on at least one of a grant rate, a prioritized bit rate, an uplink error rate, and a PBR/QCI allocation status of the wireless communication system, and automatically increasing or decreasing the PFT to control the generation of the number of compressed PDUs available for transmission based on the channel conditions.

In an embodiment, the generation of the number of compressed PDUs is automatically controlled by automatically increasing or decreasing the generation of the number of compressed PDUs available for transmission based on the PFT.

In an embodiment, the method further includes receiving, by the UE, an acknowledgment for the at least one PDU in a specified time. Further, the method includes maintaining, by the UE, PDU the specified time for an additional time unit. Further, the method includes detecting, by the UE, the checksum failure prior to expiry of the additional time unit. Further, the method includes allocating, by the UE, a successive Sequence Number (SN). Further, the method includes re-transmitting, by the UE, the at least one PDUs, corresponding to the additional time unit, for which an application layer acknowledgement has not been received and the SN for which the wireless communication system faced checksum failure as indicated by a PDCP UDC control PDU.

In an embodiment, the additional time unit is proportional to a Block Error Rate, Signal to Noise Interference ratio (SINR) and a round-trip time (RTT).

In an embodiment, the PDU for the specified time for the additional time unit is maintained by at least one of maintaining a delay timer to delay a discard of acknowledged PDUs with FU bit set to 1, an immediate discard of Acknowledged PDUs with the FU bit set to 0, and on encountering the Checksum failure retransmission of a UDC PDU.

In an embodiment, if a discard timer for compressed UDC PDU has expired, the UE transmits an un-discarded compressed UDC PDU to the wireless communication system on a receiving grant.

In an embodiment, the UE continues a transmission for in sequence PDCP PDUs not requiring the compression till the UE encounters a compressed UDC PDU.

In an embodiment, the UE halts the compression and transmission of PDCP SUDs/UDC PDUs requiring compression till a buffer reset is received from the base station.

Accordingly, embodiments herein disclose a method for handling checksum error in an UDC in a wireless communication system. The method includes synchronizing, by a base station, a compression buffer between a transmitter and a receiver based on at least one of periodically intervals and a number of data blocks. Further, the method includes compressing, by the base station, the number of data blocks at the receiver and the transmitter based on the compression buffer. Further, the method includes controlling, by the base station, a decompression at the receiver based on the compressed data block even if data PDUs are processed out of sequence.

In an embodiment, the periodically intervals and the number of data block are defined by a base station or based on aperiodic request.

In an embodiment, the compression buffer is indicated in a PDCP header of a compressed UDC PDU.

Accordingly, embodiments herein disclose a method for handling checksum error in an UDC. The method includes receiving, by a base station, a FR bit set to 1 for a first PDU from a UE. Further, the method includes performing, by the base station, a buffer reset on a receiving UDC PDU with the FR bit set to 1, when the UE is configured with a UDC for a DRB on which data being transmitted is for compressed and uncompressed and the DRB is configured with finite discard timer value and discard timer for compressed UDC PDU has expired then reset the compression buffer and creates UDC PDUs for all the subsequent sequence numbers and the UE sets FR bit to 1 for the first PDU and send to the base station.

In an embodiment, the base station delays a RLC status report sending until the UDC PDU is successfully decompressed.

In an embodiment, the base station shares a PDPC SN of last successfully decompressed UDC PDU in a UDC feedback packet with the FE bit set to 1/0.

In an embodiment, the base station sends periodic UDC control PDU with decompression feedback status.

Accordingly, embodiments herein disclose a UE for handling checksum error in an UDC in a wireless communication system. The UE includes a processor coupled with a memory. The processor is configured to detect a checksum failure and automatically control generation of a number of compressed PDUs available for transmission at a PDCP based on a PFT. The processor is configured to transmit a number of compressed PDUs.

Accordingly, embodiments herein disclose a base station for handling checksum error in an UDC in a wireless communication system. The base station includes a processor coupled with a memory. The processor is configured to synchronize a compression buffer between a transmitter and a receiver based on at least one of periodically intervals and a number of data blocks. Further, the processor is configured to compress the number of data blocks at the receiver and the transmitter based on the compression buffer. Further, the processor is configured to control a decompression at the receiver based on the compressed data block even if data PDUs are processed out of sequence.

Accordingly, embodiments herein disclose a base station for handling checksum error in an UDC. The base station includes a processor coupled with a memory. The processor is configured to receive a FR bit set to 1 for a first PDU from a UE. Further, the processor is configured to perform a buffer reset on a receiving UDC PDU with the FR bit set to 1, when the UE is configured with a UDC for a DRB on which data being transmitted is for compressed and uncompressed and the DRB is configured with finite discard timer value and discard timer for compressed UDC PDU has expired then reset the compression buffer and creates UDC PDUs for all the subsequent sequence numbers and the UE sets FR bit to 1 for the first PDU and send to the base station.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments of the inventive concept will be more clearly understood from the following detailed description taken in conjunction with the accompanying drawings, in which.

DETAILED DESCRIPTION OF THE EXEMPLARY EMBODIMENTS

Figure 1:
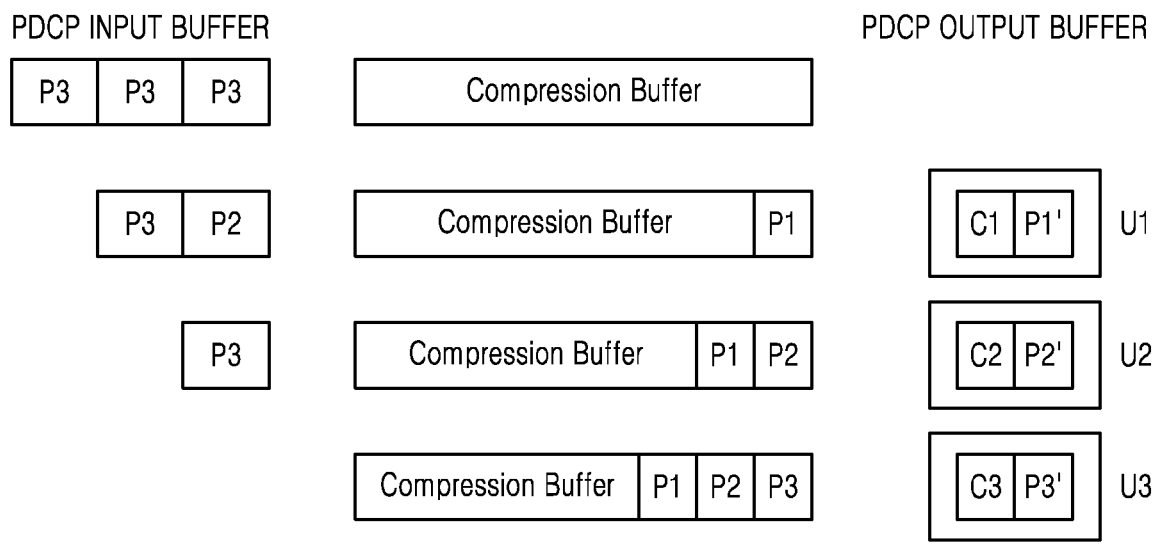
FIG. 1 illustrates a checksum calculation, according to a prior art.
Figure 2:
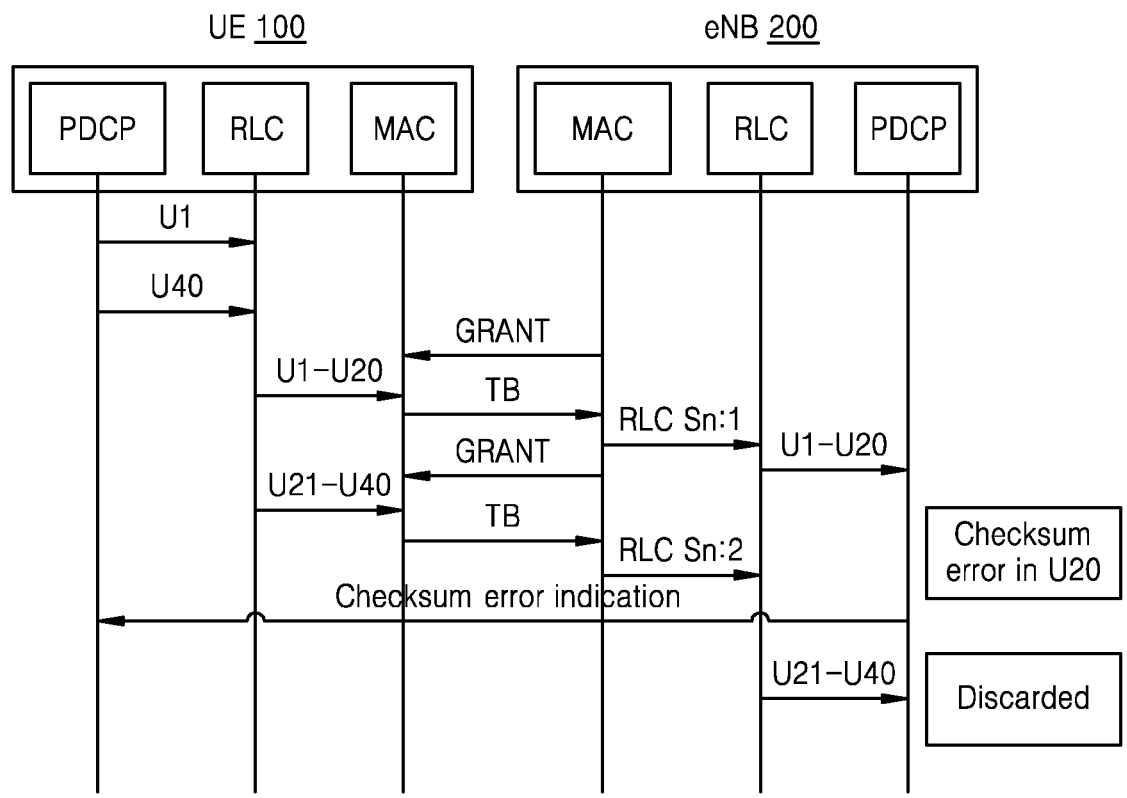
FIG. 2 is a flow diagram illustrating a method for UDC checksum error handling, according to a prior art.
Figure 3:
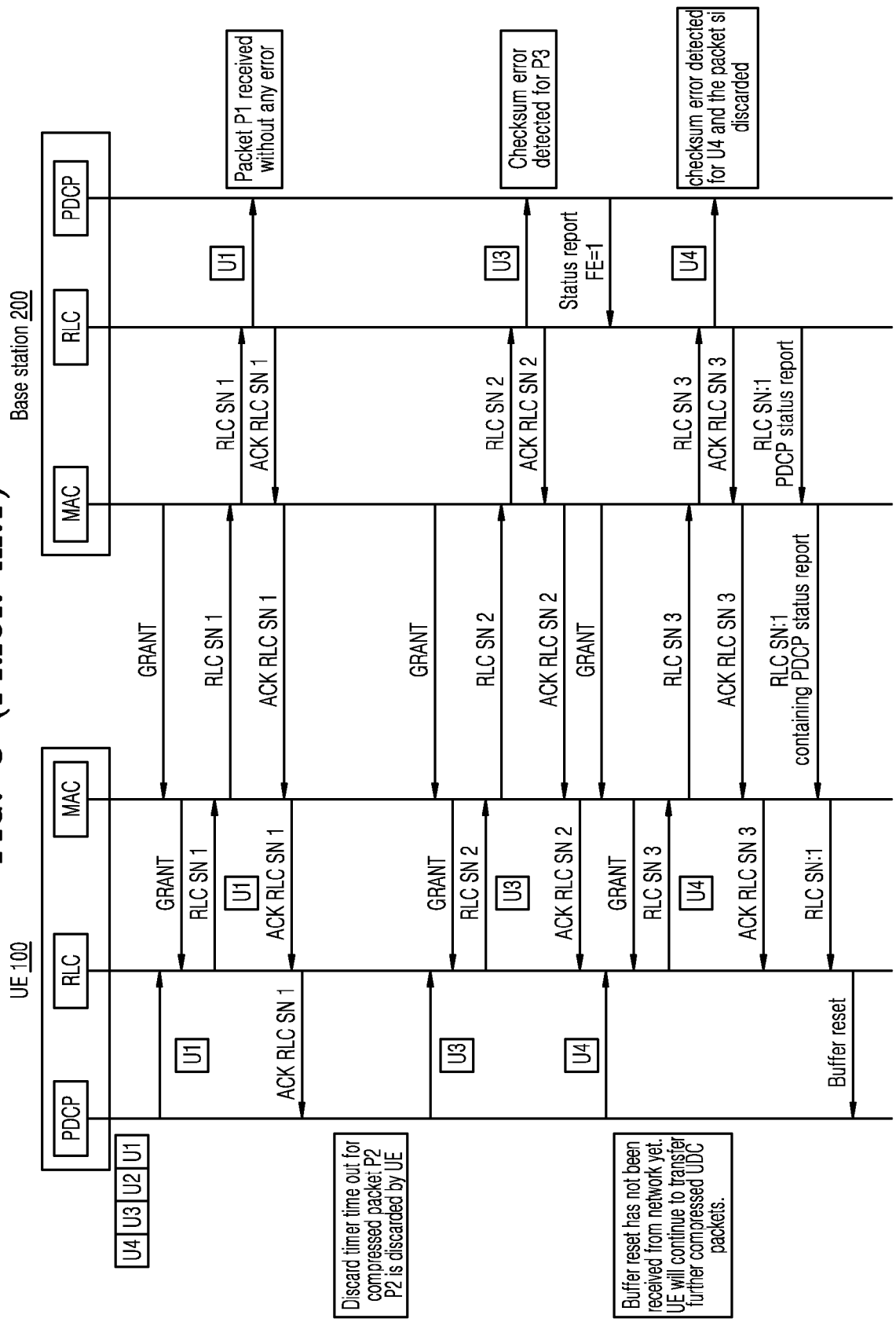
FIG. 3 is a flow diagram illustrating a checksum error detection, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for handling checksum error in an UDC in a wireless communication system. The method includes detecting, by a UE, a checksum failure. Further, the method includes automatically controlling, by the UE, generation of a number of compressed PDUs available for transmission at a Packet Data Convergence Protocol (PDCP) based on a packet formation rate (PFT). Further, the method includes transmitting, by the UE, a number of compressed PDUs.

Unlike convention method and systems, the method can be used to avoid the checksum errors during uplink data compression. The method can be used to provide a faster recovery from uplink data compression checksum error. The method can be used to reduce the TCP/IP retransmissions. The method can be used to reduce packet loss in UDC and support UDC with LTE and NR features. By using a combination of static and dynamic buffers, the method can be used to remove the dependency of in sequence data reception with little effect on compression efficiency. By using T2 timer and PDCP level re-transmission, the method provides high packet recovery.

Figure 4:
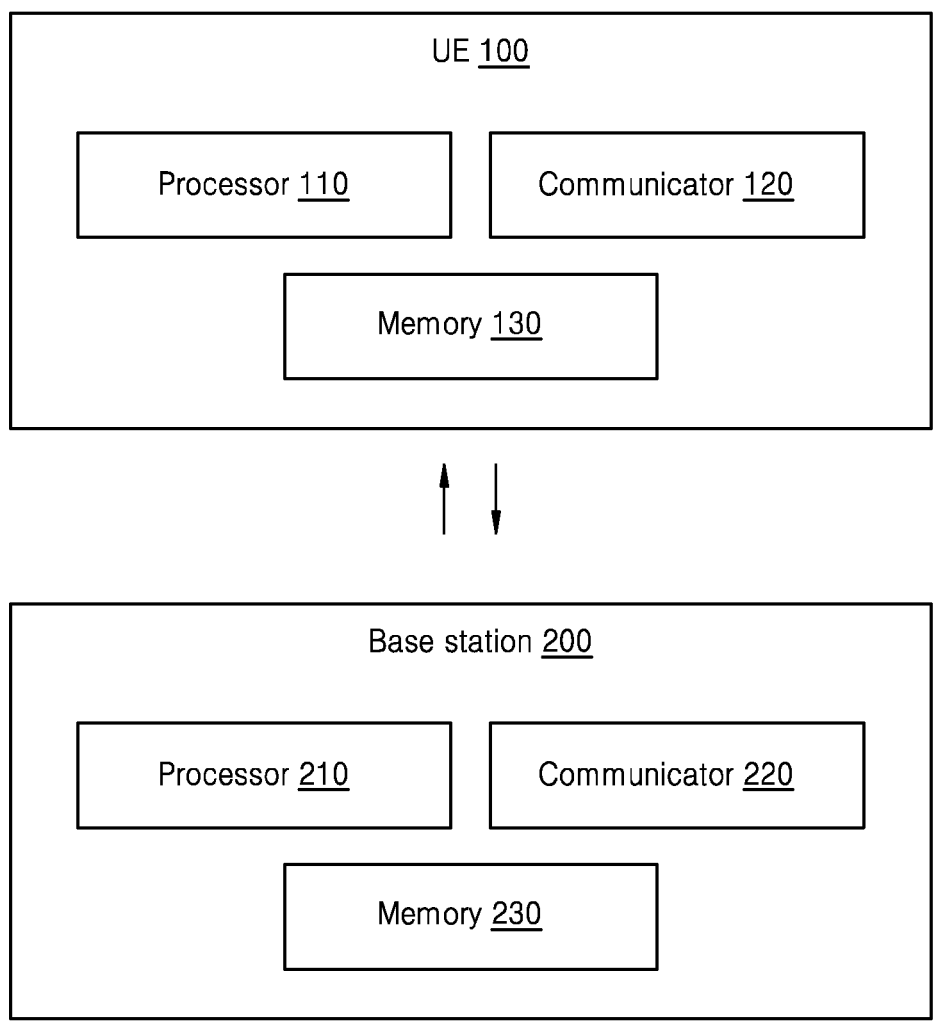
FIG. 4 illustrates a wireless communication system for handling checksum error in an uplink data compression, according to an exemplary embodiment of the inventive concept as disclosed herein.

Referring now to the drawings, and more particularly to FIGS. 4 through 12, there are shown preferred embodiments FIG. 4 illustrates a wireless communication system (300) for handling checksum error in an uplink data compression, according to an embodiment as disclosed herein. In an embodiment, the wireless communication system (300) includes a UE (100) and a base station (200). The UE (100) can be, for example but not limited to a cellular phone, a tablet, a smart phone, a laptop, a Personal Digital Assistant (PDA), a global positioning system, a multimedia device, a video device, an internet of things (IoT) device, a smart watch, a game console, a smart watch, a foldable display device, an Unmanned Aerial Vehicle (UAV), an airplane or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB or the like.

In an embodiment, the UE (100) includes a processor (110), a communicator (120), and a memory (130). The processor (110) is coupled with the memory (130) and the communicator (120). In an embodiment, the processor (110) is configured to detect a checksum failure and automatically control generation of a number of compressed PDUs available for transmission at a PDCP based on a packet formation rate (PFT). Further, the processor (110) is configured to transmit a number of compressed PDUs.

In an embodiment, the PFT is configured for at least one UDC enabled bearer to control the number of compressed PDUs available for transmission.

In an embodiment, the PFT is determined by determining a channel conditions based on at least one of a grant rate, a prioritized bit rate, an uplink error rate, and a PBR/QCI allocation status of the base station (200) and automatically increasing or decreasing the PFT to control the generation of the number of compressed PDUs available for transmission based on the channel conditions.

In an embodiment, the generation of the number of compressed PDUs is automatically controlled by automatically increasing or decreasing the generation of the number of compressed PDUs available for transmission based on the PFT.

In an embodiment, the processor (110) is configured to receive an acknowledgment for the at least one PDU in a specified time and maintain PDU the specified time (T1) for an additional time unit (T2). Further, the processor (110) is configured to detect the checksum failure prior to expiry of the additional time unit and allocate a successive SN. Further, the processor (110) is configured to re-transmit the at least one PDUs, corresponding to the additional time unit, for which an application layer acknowledgement has not been received and the SN for which the base station faced checksum failure as indicated by a PDCP UDC control PDU.

In an embodiment, the additional time unit is proportional to a Block Error Rate, Signal to Noise Interference ratio (SINR) and a round-trip time (RTT).

In an embodiment, the PDU for the specified time for the additional time unit is maintained by at least one of maintaining a delay timer to delay a discard of acknowledged PDUs with FU bit set to 1, an immediate discard of Acknowledged PDUs with the FU bit set to 0, and on encountering the Checksum failure retransmission of a UDC PDU.

In an embodiment, if a discard timer for compressed UDC PDU has expired, the UE (100) transmits an un-discarded compressed UDC PDU to the base station (200) on a receiving grant.

In an embodiment, the UE (100) continues a transmission for in sequence PDCP PDUs not requiring the compression till the UE (100) encounters a compressed UDC PDU.

In an embodiment, the UE (100) halts the compression and transmission of PDCP SDUs/UDC PDUs requiring compression till a buffer reset is received from the base station (200).

In an embodiment, for an UDC enabled radio bearer (RB), to avoid/recover fast from UDC checksum error, the UE (100) requests early RLC Status report by periodically setting the poll bit while transmitting the PDU. Further, timer of the periodic request, T1, is a function (MIN) of RLC status-prohibit timer, average time taken to transmit NUM_POLL_PDU, time taken to transmit NUM_POLL_BYTE. Furthermore, for setting the poll bit for RLC PDU, the UE (100) considers its own threshold for NUM_POLL_PDU, NUM_POLL_BYTE and does not strictly adhere to the network configured values.

In an embodiment, for an UDC enabled radio bearer (RB), on receiving the RLC status report, the UE (100) deletes acknowledged PDCP PDUs (RLC service data unit (SDUs)) with FU bit as zero and starts a timer T2 (i.e., additional timer) if there is at least one FU=1 PDCP PDU acknowledged in the received RLC status report.

In an embodiment, on expiry of the timer, T2
1. The UE (100) discards the acknowledged PDCP PDUs with FU bit set as one till updated VT_A value, wherein as per 36.322 spec, VT_A (Acknowledgement state variable) holds the value of the SN of the next AMD PDU for which positive Ack is to be received in-sequence; and
2. The UE (100) does not discard the acknowledged PDCP PDUs with FU bit set as one between updated VT_A and ACK_SN In an embodiment, while the timer 'T2' (i.e., additional timer) is running and the UE (100) receives a PDCP Control PDU for UDC feedback packet with FE bit set to zero, the UE (100) stops the timer 'T2'.

In an embodiment, while the timer 'T2' is running and the UE (100) receives a PDCP Control PDU for UDC feedback packet with FE bit set to one, the UE (100) stops the timer 'T2'. Further, the UE (100), on receiving UDC feedback packet with FE bit set to 1, maps the PDCP sequence number for last acknowledged TCP packet which was sent as compressed UDC packet. Furthermore, the UE (100) uses this mapped PDCP sequence as one of the input parameter to derive N, where, "N>=1" and N is an integer.

In an embodiment, the UE (100) submits the 'uncompressed (original or data part) PDCP SDUs' with FU bit one, mapped on RLC starting from VT_A-N up to VT_S-1 as fresh PDCP SDU to the beginning of the PDCP SDU queue wherein as per spec 36.322, VT_S (Send state variable) holds the value of SN to be assigned for next newly generated AMD PDU, so, in this case, on receiving checksum error indication, all the packets between VT_A (for which RLC Ack has been received) and VT_S-1 (last transmitted SN) have to be re-transmitted. In addition to this, the 'N' is derived as mentioned in [0074] to obtain the first SN which requires re-transmission (VT_A-N).

In an embodiment, the UE (100) resets the UDC compression buffer and prepares fresh UDC PDU for all the un-transmitted PDCP PDUs. FR bit for first PDCP PDU after compression buffer reset at reception of PDCP control PDU for UDC feedback packet is set to one as per the spec. FR bit is already defined as per 36.322 specification.

In an embodiment, the UE (100) prepares fresh UDC PDUs for all the RLC SDUs, with FU bit one, mapped on RLC starting from VT_A-N.

In an embodiment, while preparing fresh UDC PDUs, the UE (100) resets the UDC compression buffer and allocates first un-transmitted PDCP SN and subsequent SN value for PDCP sequence numbering, ciphering.

In an embodiment, the UE (100) subsequently prepare fresh UDC PDU for all the un-transmitted PDCP PDUs too.

In an embodiment, the UE (100) receives the PDCP sequence number of last successfully decompressed UDC packet from network as part of UDC feedback packet with FE bit set to 1.

In an embodiment, the UE (100) will create fresh UDC PDU for all the subsequent sequence numbers, set FR bit to 1 for the first PDU and send to network as per spec.

In an embodiment, the value of the timer, T2, is a function of maximum RLC retransmission timer, downlink BER, downlink data rate.

In an embodiment, when the UE (100) is configured with UDC for the DRB on which data being transmitted could be both compressed and uncompressed and the DRB is configured with finite discard timer value and discard timer for any compressed UDC PDU has expired then on receiving grant, transmit only one next in sequence un-discarded compressed UDC PDU to the base station (200).

In an embodiment, the UE (100) will halt the compression and transmission of packets requiring compression till buffer reset is received from the base station (200).

In an embodiment, the UE (100) will continue the transmission for in sequence PDCP PDUs not requiring the compression till it encounters a compressed packet.

In an embodiment, when the UE (100) was configured with UDC for the DRB on which data being transmitted could be both compressed and uncompressed and the DRB is configured with finite discard timer value and discard timer for any compressed UDC PDU has expired then reset the compression buffer and create UDC PDUs for all the subsequent sequence numbers. Set FR bit to 1 for the first PDU and send to the base station (200).

In an embodiment, the base station (200) will perform buffer reset on receiving UDC PDU with FR bit set to 1.

In an embodiment, when the UE (100) was configured with UDC for the DRB on which data being transmitted could be both compressed and uncompressed and said DRB was configured with finite discard timer value then do not discard PDCP PDUs for which FU bit value was set to 1 and discard only the PDCP PDUs for which FU bit value was set as 0 on their discard timer expiry.

In an embodiment, the UE (100) will maintain history of compression buffers and on discarding the UDC packet due to discard timer expiry, it will use appropriate compression buffer for recompression of further un-discarded packets.

In an embodiment, the compression buffer history may be maintained till PDCP discard timer duration.

In an embodiment, while framing the PDCP PDU, the PDCP SDU for which UDC has to be applied may be prioritised over the PDCP SDU which does not require UDC to avoid discard timer expiry. All the SN related addition/subtraction follows the modulo operation as defined in spec.

The processor (110) is configured to execute instructions stored in the memory (130) and to perform various processes. The communicator (120) is configured for communicating internally between internal hardware components and with external devices via one or more networks.

The memory (130) stores instructions to be executed by the processor 140. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

The processor (210) is configured to synchronize a compression buffer between a UE (100) and the base station (200) based on at least one of periodically intervals and a number of data blocks and compress the number of data blocks at the UE (100) and the base station (200) based on the compression buffer. Further, the processor (210) is configured to control a decompression at the base station (200) based on the compressed data block even if data PDUs are processed out of sequence.

In an embodiment, the periodically intervals and the number of data block are defined by the base station (200) or based on aperiodic request.

In an embodiment, the compression buffer is indicated in a PDCP header of a compressed UDC PDU.

The processor (210) is configured to receive a FR bit set to 1 for a first PDU from a UE (100). Further, the processor (210) is configured to perform a buffer reset on a receiving UDC PDU with the FR bit set to 1, when the UE (100) is configured with a UDC for a DRB on which data being transmitted is for compressed and uncompressed and the DRB is configured with finite discard timer value and discard timer for compressed UDC PDU has expired then reset the compression buffer and creates UDC PDUs for all the subsequent sequence numbers and the UE (100) sets FR bit to 1 for the first PDU and send to the base station (200).

In an embodiment, the base station (200) delays a RLC status report sending until the UDC PDU is successfully decompressed.

In an embodiment, the base station (200) shares a PDPC SN of last successfully decompressed UDC PDU in a UDC feedback packet with the FE bit set to 1/0.

In an embodiment, the base station (200) sends periodic UDC control PDU with decompression feedback status.

The processor (210) is configured to execute instructions stored in the memory (230) and to perform various processes. The communicator (220) is configured for communicating internally between internal hardware components and with external devices via one or more networks.

The memory (230) stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In some examples, the memory (230) can be configured to store larger amounts of information than the memory. In certain examples, a non-transitory storage medium may store data that can, over time, change (e.g., in Random Access Memory (RAM) or cache).

Although the FIG. 4 shows various hardware components of the wireless communication system (300) but it is to be understood that other embodiments are not limited thereon. In other embodiments, the wireless communication system (300) may include less or more number of components. Further, the labels or names of the components are used only for illustrative purpose and does not limit the scope of the invention. One or more components can be combined together to perform same or substantially similar function to handle the checksum error in the UDC in the wireless communication system (300).

Figure 5:
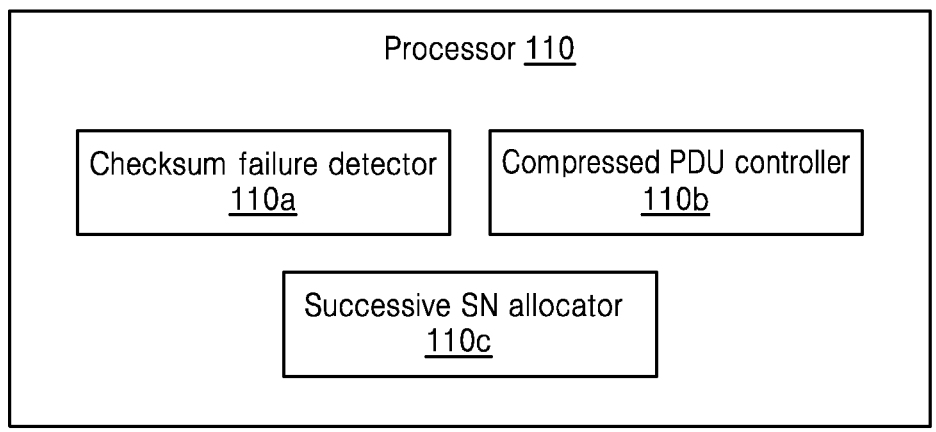
FIG. 5 illustrates various elements in a processor included in a UE, according to an exemplary embodiment of the inventive concept as disclosed herein.

FIG. 5 illustrates various elements in the processor (110) included in the UE (100), according to the embodiments as disclosed herein. In an embodiment, the processor (110) includes a checksum failure detector (110a), a compressed PDU controller (110b), and a successive SN allocator (110c). The checksum failure detector (110a) is configured to detect the checksum failure. The compressed PDU controller (110b) is configured to automatically control the generation of a number of compressed PDUs available for transmission at the PDCP based on the PFT and transmit the number of compressed PDUs.

In an embodiment, the successive SN allocator (110c) is configured to receive an acknowledgment for the at least one PDU in a specified time and maintain PDU the specified time for an additional time unit. Further, the successive SN allocator (110c) is configured to detect the checksum failure prior to expiry of the additional time unit and allocate a successive SN. Further, the successive SN allocator (110c) is configured to re-transmit the at least one PDUs, corresponding to the additional time unit, for which an application layer acknowledgement has not been received and the SN for which the base station faced checksum failure as indicated by a PDCP UDC control PDU.

Although the FIG. 5 shows various hardware components of the processor (110) but it is to be understood that other embodiments are not limited thereon. In other embodiments, the processor (110) may include less or more number of components. Further, the labels or names of the components are used only for illustrative purpose and does not limit the scope of the invention. One or more components can be combined together to perform same or substantially similar function to handle the checksum error in the UDC in the wireless communication system (300).

Figure 6:
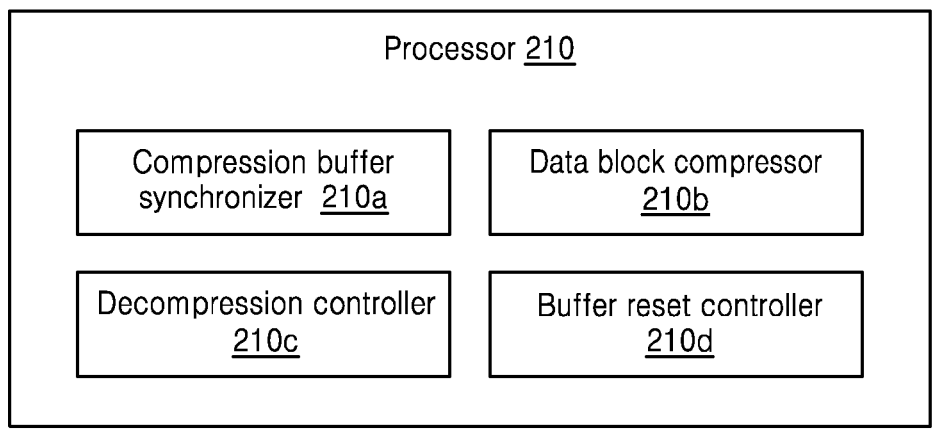
FIG. 6 illustrates various elements in a processor included in a base station, according to an exemplary embodiment of the inventive concept as disclosed herein.

FIG. 6 illustrates various elements in the processor (210) included in the base station (200), according to the embodiments as disclosed herein. In an embodiment, the processor (210) includes a compression buffer synchronizer (210a), a data block compressor (210b), a decompression controller (210c) and a buffer reset controller (210d).

The compression buffer synchronizer (210a) is configured to synchronize the compression buffer between the UE (100) and the base station (200) based on at least one of periodically intervals and a number of data blocks. Further, the data block compressor (210b) is configured to compress the number of data blocks at the UE (100) and the base station (200) based on the compression buffer. Further, the decompression controller (210c) is configured to control a decompression at the base station (200) based on the compressed data block even if data PDUs are processed out of sequence.

The buffer reset controller (210d) is configured to receive a FR bit set to 1 for a first PDU from a UE (100). Further, the buffer reset controller (210d) is configured to perform a buffer reset on a receiving UDC PDU with the FR bit set to 1, when the UE (100) is configured with a UDC for a DRB on which data being transmitted is for compressed and uncompressed and the DRB is configured with finite discard timer value and discard timer for compressed UDC PDU has expired then reset the compression buffer and creates UDC PDUs for all the subsequent sequence numbers and the UE sets FR bit to 1 for the first PDU and send to the base station (200).

Although the FIG. 6 shows various hardware components of the processor (210) but it is to be understood that other embodiments are not limited thereon. In other embodiments, the processor (210) may include less or more number of components. Further, the labels or names of the components are used only for illustrative purpose and does not limit the scope of the invention. One or more components can be combined together to perform same or substantially similar function to handle the checksum error in the UDC in the wireless communication system (300).

Figure 7:
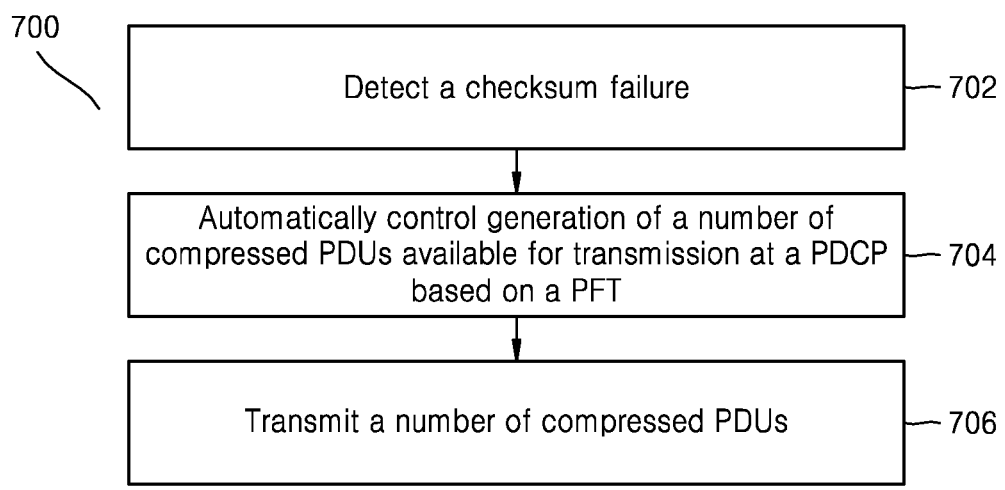
FIG. 7 is a flow diagram illustrating a method, implemented by the UE, for handling checksum error in the UDC in the wireless communication system, according to an exemplary embodiment of the inventive concept as disclosed herein.

FIG. 7 is a flow diagram (700) illustrating a method, implemented by the UE (100), for handling checksum error in the UDC in the wireless communication system (300), according to the embodiments as disclosed herein. The operations (702-706) are performed by the processor (110).

At 702, the method includes detecting the checksum failure. At 704, the method includes automatically control generation of the number of compressed PDUs available for transmission at the PDCP based on the PFT. At 706, the method includes transmitting the number of compressed PDUs.

Figure 8:
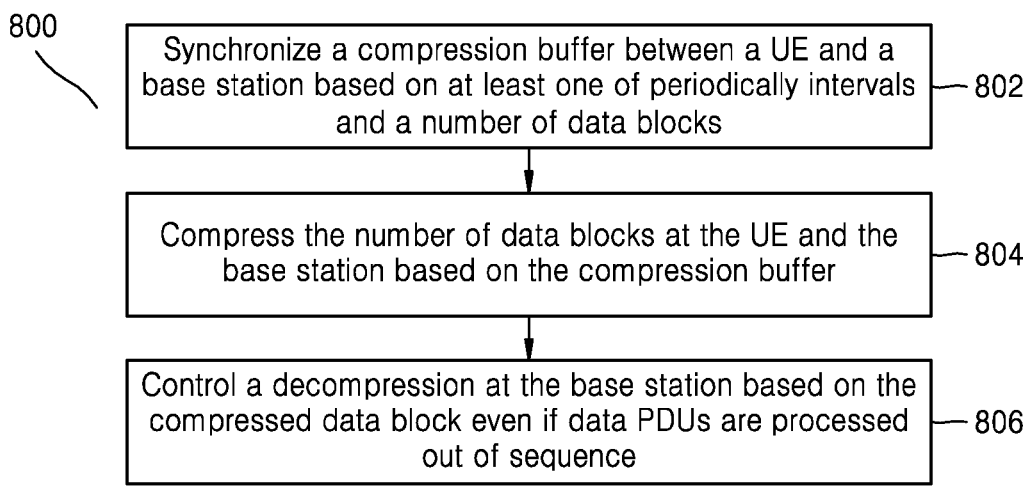
FIG. 8 and FIG. 9 are flow diagrams illustrating a method, implemented by the base station, for handling checksum error in the UDC in the wireless communication system, according to an exemplary embodiment of the inventive concept as disclosed herein.
Figure 9:
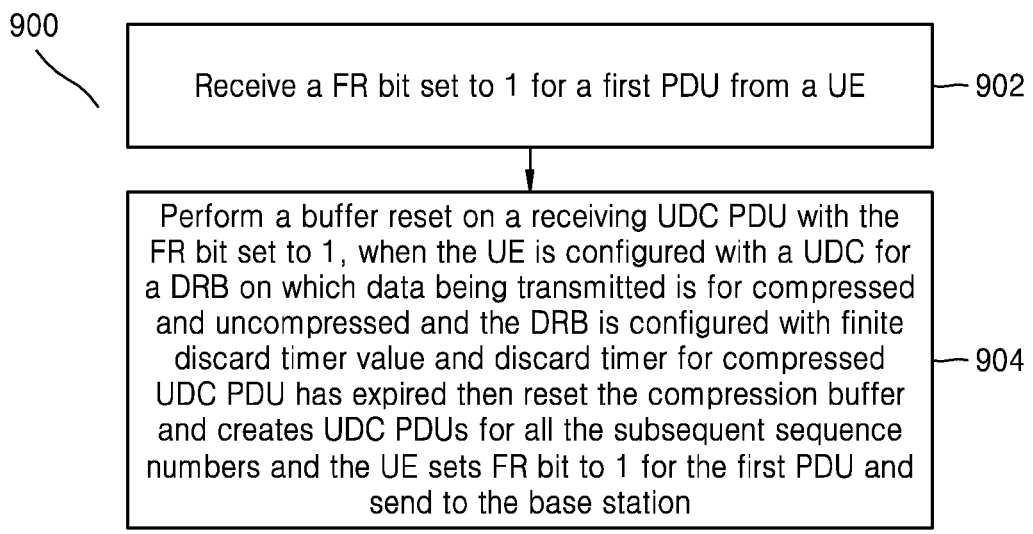

FIG. 8 and FIG. 9 are flow diagrams (800 and 900) illustrating a method, implemented by the base station (200), for handling checksum error in the UDC in the wireless communication system (300), according to the embodiments as disclosed herein.

As shown in the FIG. 8, the operations (802-806) are performed by the processor (210). At 802, the method includes synchronizing the compression buffer between the UE (100) and the base station (200) based on at least one of periodically intervals and the number of data blocks. At 804, the method includes compressing the number of data blocks at the UE (100) and the base station (200) based on the compression buffer. At 806, the method includes controlling the decompression at the base station (200) based on the compressed data block even if data PDUs are processed out of sequence.

As shown in the FIG. 9, the operations (902-904) are performed by the processor (210). At 902, the method includes receiving the FR bit set to 1 for the first PDU from the UE. At 904, the method includes performing the buffer reset on a receiving UDC PDU with the FR bit set to 1, when the UE (100) is configured with a UDC for a DRB on which data being transmitted is for compressed and uncompressed and the DRB is configured with finite discard timer value and discard timer for compressed UDC PDU has expired then reset the compression buffer and creates UDC PDUs for all the subsequent sequence numbers and the UE (100) sets FR bit to 1 for the first PDU and send to the base station (200).

Figure 10:
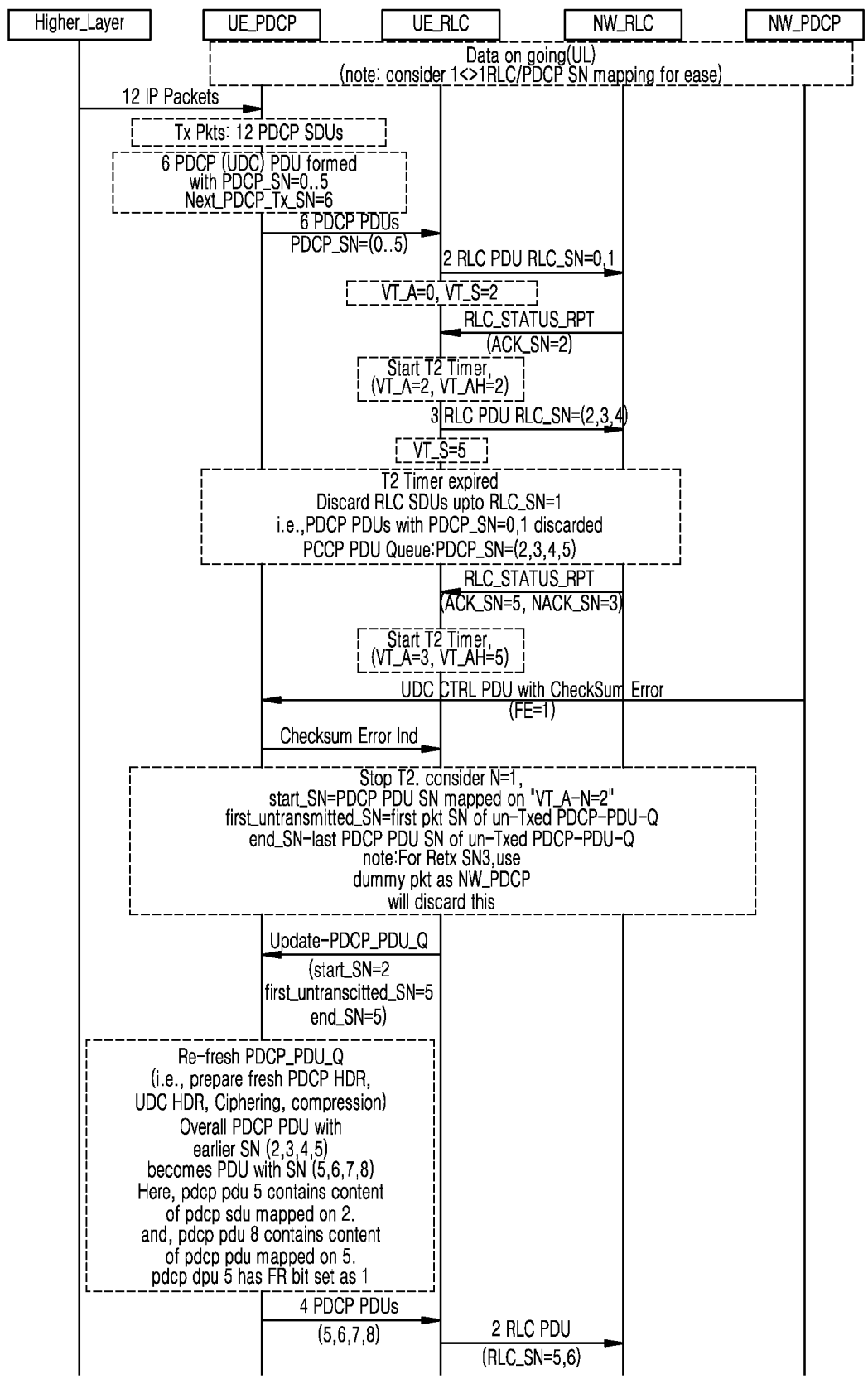
FIG. 10 is a sequence diagram illustrating a method for handling checksum error in the UDC in the wireless communication system based on the preventive procedure, according to an exemplary embodiment of the inventive concept as disclosed herein.

FIG. 10 is a sequence diagram illustrating a method for handling checksum error in the UDC in the wireless communication system (300) based on the preventive procedure, according to an embodiment as disclosed herein.

Preventive Procedure:
1. Prioritizing of PDCP SDUs requiring compression over PDCP SDUs not requiring compression.
2. Do not discard PDCP PDU with FU bit set to 1 after PDCP discard timer expiry.
3. Form less number of UDC PDUs (or define packet formation rate), when UE encounter below condition,
   a. Do not compress more PDCU SDUs when UE finds network is not meeting PBR/QCI allocation.
   b. Do not compress more PDCU SDUs when UE enters poor signal conditions (RSRP, RSRQ).

For example below algorithm explains the packet formation rate.

Example: more factors can be incorporated at later point of time to compute packet formation rate
PBR=8 Kbps RSRP=−100, RSRQ=2, UL Grant rate=4 Kbps, BLER=20%
(Current) packet formation rate, R=X $$\text{(New) packet formation rate}, R' = R*(\text{grant\_rate}/\text{pbr})*(1-\text{bler \%}/100) \quad \text{[Algorithm equation]}$$

$$R' = X*(4\ Kbps/8\ Kbps)*(4/5)$$
$$= X/2*4/5$$
$$= 2X/5$$

Where R=X is initialised using below algorithm
a) If other RB is active and ongoing data, use the pbr_udc_bearer*(grant_rate_alloc_OtherRB/pbr_otherRB) *(1−bler/100)
b) If other RB is not active and not ongoing data, use a populated table for packet formation built up on PBR, GRANT, BLER in current signal condition.

Note—packet formation rate is applicable or kicks in
a) When UE side one packet is discarded,
b) When UE PBR is not met.
4. Maintain history of compression buffers and on discarding a UDC packet due to discard timer expiry, use appropriate compression buffer for recompression of further un-discarded packets.

Recovery Methods Requiring Only UE Changes:
1. Method of handling of acknowledged compressed and uncompressed PDUs by,
   a. Maintaining delay timer to delay the discard of acknowledged PDCP PDUs with FU bit set to 1.
   b. Immediate discard of acknowledged PDCP PDUs with FU bit set to 0.
   c. On encountering UDC checksum failure retransmission of UDC PDU.
2. Method of handling of finite value of discard timer for UDC enabled bearer.
   a. If discard timer for any compressed UDC PDU has expired then on receiving grant, transmit only one next in sequence un-discarded compressed UDC PDU to network. In other words, UE continues the transmission for in sequence PDCP PDUs not requiring the compression till it encounters a compressed UDC PDU.
   b. UE halts the compression and transmission of PDCP SUDs/UDC PDUs requiring compression till buffer reset is received from network.

Recovery Methods Requiring NW and UE Changes,
1. When UE was configured with UDC for a DRB on which data being transmitted could be both compressed and uncompressed and said DRB was configured with finite discard timer value and discard timer for any compressed UDC PDU has expired then reset the compression buffer and create UDC PDUs for all the subsequent sequence numbers. Set FR bit to 1 for the first PDU and send to network. Network will perform buffer reset on receiving UDC PDU with FR bit set to 1.
2. Network delays RLC status report sending until the UDC PDU is successfully decompressed.

3. Network shares PDPC SN of last successfully decompressed UDC PDU as part of UDC feedback packet with FE bit set to 1/0.
4. Network sends periodic UDC control PDU with decompression feedback status.

Figure 11:
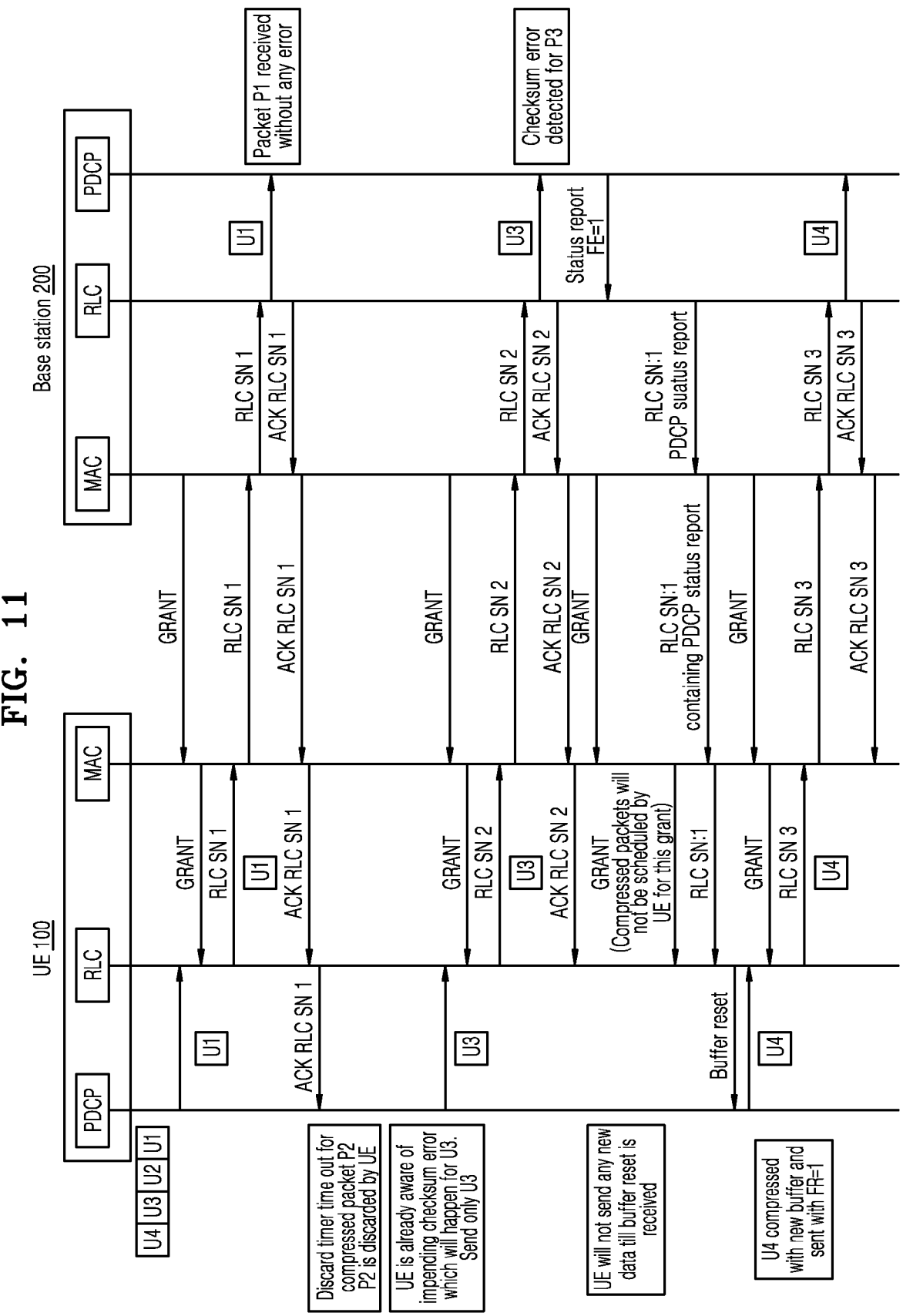
FIG. 11 is a sequence diagram illustrating a method for handling checksum error in the UDC in the wireless communication system based on the preventive procedure, according to an exemplary embodiment of the inventive concept as disclosed herein.

FIG. 11 is a sequence diagram illustrating a method for handling checksum error in the UDC in the wireless communication system (300) based on the preventive procedure, according to an embodiment as disclosed herein.

As shown in the FIG. 11, the UE (100) transmits the uncompressed PDUs of the compressed UDC PDU. Further, the UE (100) transmits the next in sequence uncompressed UDC PDUs if the base station (200) has reordering timer enabled for this RB. Further, the UE (100) transmits other RBs data over this grant if other RBs data exist. Further, the UE (100) does not transmit any PDUs over this grant. The base station (200) will indicate HARQ NACK for this MAC TB and the UE (100) could do retransmission. By this method, the UE (100) will get extra time till retransmission opportunity and it could compress subsequent UDC PDUs and update the HARQ buffer with the compressed content. Further, the UE (100) just transmit one subsequent UDC PDU and fill rest with padding. Further, the UE (100) could just fill Padding on whole grant.

Figure 12:
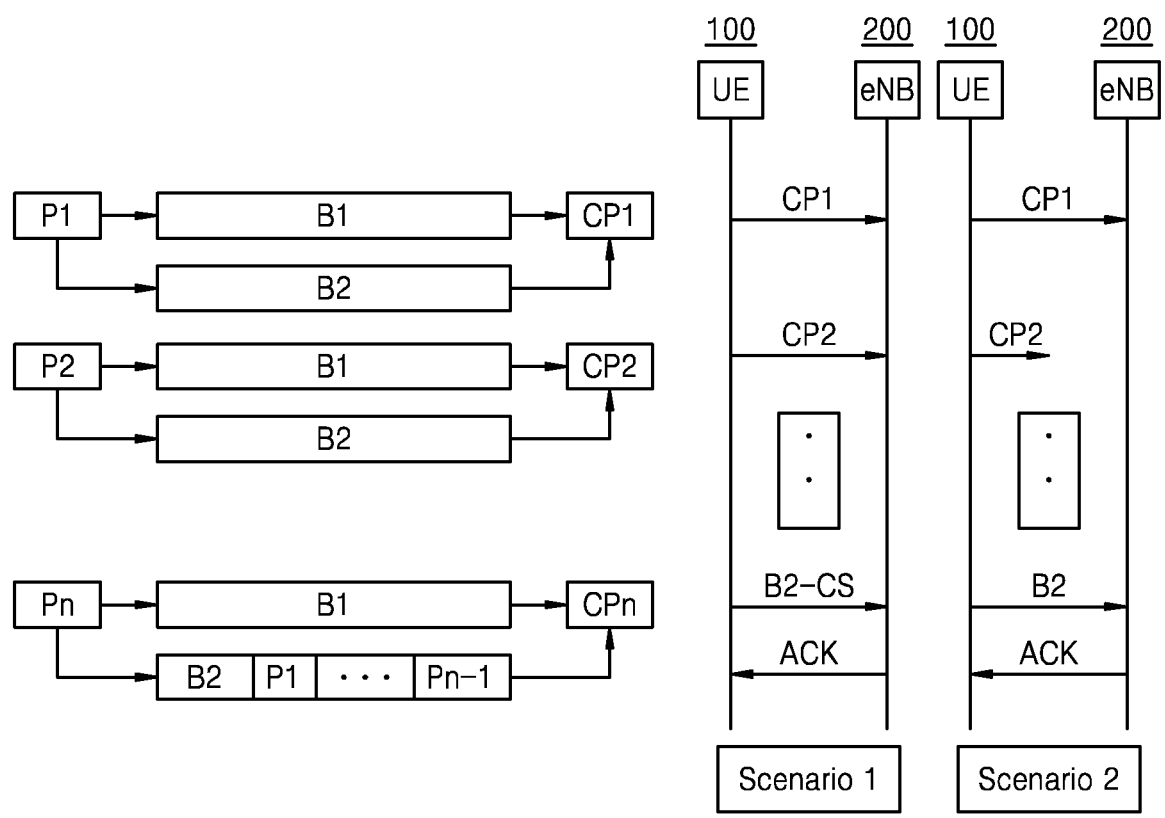
FIG. 12 is a sequence diagram illustrating a method for handling checksum error in the UDC in the wireless communication system based on interworking UDC with NR/New features, according to an exemplary embodiment of the inventive concept as disclosed herein.

FIG. 12 is a sequence diagram illustrating a method for handling checksum error in the UDC in the wireless communication system (300) based on interworking UDC with NR/New features, according to an embodiment as disclosed herein. The method proposes to synchronize the compression buffer between the transmitter (e.g., UE (100)) and the receiver (e.g., base station (200)) periodically every T time and/or every N data block as defined by network configuration or based on aperiodic request. During the time, the same compression buffer, as B1, is used for (de)compressing the data block at the receiver and the transmitter side respectively. This will ensure immediate decompression at the receiver side (without checksum failure) even though data PDUs are delivered/processed out of sequence and thus ensuring balanced processing load. FIG. 12 depicts usage of semi-static compression buffer B1 for data compression for data block P1 to Pn and in parallel maintains a running compression buffer B2 which is updated every data block. B1 is updated with content of B2 once B2 is synched between transmitter and receiver. This synchronization can be achieved by exchanging a checksum computed solely based on B2 (thus ensuring reduced network resource consumption) or B2 itself.

The proposed method and system provides data throughput improvement, reduces the battery consumption and TCP/IP retransmission and RTT, and provides faster recovery from checksum errors and enhanced user experience.

The various actions, acts, blocks, steps, or the like in the flow diagrams (700-900) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for handling checksum error in an uplink data compression (UDC) in a wireless communication system, comprising:
    upon User Equipment (UE) detecting a checksum failure, determining, by the UE, a packet formation rate (PFT) from current channel conditions;
    adjusting, a number based on the PFT;
    controlling, by the UE, generation of the number of compressed protocol data units (PDUs) available for transmission at a Packet Data Convergence Protocol (PDCP); and
    transmitting, by the UE, the number of compressed PDUs to a base station.

2. The method of claim 1, wherein the PFT is configured for at least one UDC enabled bearer to control the number of compressed PDUs available for transmission.

3. The method of claim 1, wherein the PFT is determined by:
    determining the channel conditions based on at least one of a grant rate, a prioritized bit rate, an uplink error rate, and a Prioritized Bit Rate (PBR) allocation status of the base station and a Quality of Service Class Identifier (QCI) allocation status of the base station; and
    controlling the generation of the number of compressed PDUs available for transmission based on the channel conditions.

4. The method of claim 1, wherein the generation of the number of compressed PDUs is automatically controlled by automatically increasing or decreasing the generation of the number of compressed PDUs available for transmission based on the PFT.

5. The method of claim 1, further comprising:
    receiving, by the UE, an acknowledgment for the at least one PDU in a specified time;
    maintaining, by the UE, a PDU at the specified time for an additional time unit;
    detecting, by the UE, the checksum failure prior to expiry of the additional time unit;
    allocating, by the UE, a successive Sequence Number (SN); and
    re-transmitting, by the UE, the at least one PDUs, corresponding to the additional time unit, for which an application layer acknowledgement has not been received and the SN for which the base station faced checksum failure as indicated by a PDCP UDC control PDU.

6. The method of claim 5, wherein the additional time unit is proportional to a Block Error Rate, Signal to Noise Interference ratio (SINR) and a round-trip time (RTT).

7. The method of claim 5, wherein the PDU for the specified time for the additional time unit is maintained by at least one of maintaining a delay timer to delay a discard of acknowledged PDUs with an FU bit set to 1, an immediate discard of Acknowledged PDUs with the FU bit set to 0, and on encountering the checksum failure retransmission of a UDC PDU.

8. The method of claim 5, wherein if a discard timer for a compressed UDC PDU has expired, the UE transmits an un-discarded compressed UDC PDU to the base station on a receiving grant.

9. The method of claim 5, wherein the UE continues a transmission for in sequence PDCP PDUs not requiring the compression till the UE encounters a compressed UDC PDU.

10. The method of claim 5, wherein the UE halts the compression and transmission of PDCP SUDs and UDC PDUs requiring compression till a buffer reset is received from the base station.

11. A method for handling checksum error in an uplink data compression (UDC) in a wireless communication system, comprising:
synchronizing, by a base station, a compression buffer between user equipment (UE) and a base station;
compressing, by the base station, a number of data blocks at the UE and the base station based on the compression buffer; and
controlling, by the base station, a decompression at the UE based on the compressed data block even if data protocol data units (PDUs) are processed out of sequence.

12. The method of claim 11, wherein the compression buffer is indicated in a Packet Data Convergence Protocol (PDCP) header of a compressed UDC PDU.

13. The method of claim 11, wherein the compression buffer is synchronized between the UE and the base station based on at least one of periodic intervals and the number of data blocks.

14. The method of claim 13, wherein the periodic intervals and the number of data blocks are defined by the base station or based on an aperiodic request.

15. A method for handling checksum error in an uplink data compression (UDC) in a wireless communication system, comprising:
receiving, by a base station, an FR bit set to 1 for a first protocol data unit (PDU) from user equipment (UE); and
performing, by the base station, a buffer reset on a receiving UDC PDU with the FR bit set to 1.

16. The method of claim 15, wherein the base station delays an RLC status report sending until the UDC PDU is successfully decompressed.

17. The method of claim 15, wherein the base station shares a Packet Data Convergence Protocol (PDCP) sequence number (SN) of last successfully decompressed UDC PDU in a UDC feedback packet with an FE bit set to 1 or 0.

18. The method of claim 15, wherein the base station sends periodic UDC control PDU with decompression feedback status.

19. The method of claim 15, wherein when the UE is configured with a UDC for a data radio bearer (DRB) on which data being transmitted is compressed and uncompressed and the DRB is configured with a finite discard timer value, and a discard timer for compressed UDC PDU has expired then reset the compression buffer and creates UDC PDUs for all the subsequent sequence numbers and the UE sets the FR bit to 1 for the first PDU and send to the base station.

* * * * *